(12) United States Patent
Daskiewich et al.

(10) Patent No.: US 10,813,444 B2
(45) Date of Patent: Oct. 27, 2020

(54) POROUS POLYMERIC POLISHING BRISTLES AND METHODS FOR THEIR MANUFACTURE

(71) Applicant: JH Rhodes Company, Inc., Phoenix, AZ (US)

(72) Inventors: Scott Daskiewich, Oriskany, NY (US);
Brent Muncy, Chandler, AZ (US);
James Klein, Syracuse, NY (US);
Peter Rentein, Scottsdale, AZ (US)

(73) Assignee: JH Rhodes Company, Inc., Phoenix, AZ (US)

( * ) Notice: Subject to any disclaimer, the term of this patent is extended or adjusted under 35 U.S.C. 154(b) by 124 days.

(21) Appl. No.: 15/989,642

(22) Filed: May 25, 2018

(65) Prior Publication Data
US 2019/0350356 A1 Nov. 21, 2019

Related U.S. Application Data

(60) Provisional application No. 62/672,524, filed on May 16, 2018.

(51) Int. Cl.
*A46B 13/02* (2006.01)
*C08J 9/04* (2006.01)
(Continued)

(52) U.S. Cl.
CPC ............ *A46B 13/02* (2013.01); *A46D 1/0207* (2013.01); *A46D 1/0261* (2013.01);
(Continued)

(58) Field of Classification Search
CPC .. A46D 1/0207; A46D 1/0261; B24D 13/145; C08J 9/04; C08J 2375/02; C08J 2375/04
See application file for complete search history.

(56) References Cited

U.S. PATENT DOCUMENTS 5,427,595 A * 6/1995 Pihl .................... A01D 34/4168
51/298
5,460,883 A * 10/1995 Barber, Jr. ............... A46D 1/00
428/370

(Continued)

FOREIGN PATENT DOCUMENTS

| CN | 105458946 | 4/2016 |
| KR | 2016009799 | 7/2017 |
| WO | 2015151784 A1 | 10/2015 |

OTHER PUBLICATIONS

Restriction Requirement dated May 29, 2020 in the U.S. Appl. No. 15/808,643.

*Primary Examiner* — Marc Carlson
(74) *Attorney, Agent, or Firm* — Snell & Wilmer L.L.P.

(57) ABSTRACT

Polishing media in the form of bristles made from a porous polymer-based material, apparatus and systems including the media, and methods of forming and using the media, apparatus, and systems are disclosed. A method of manufacturing bristles for use in polishing a workpiece which includes a non-planar surface includes the steps of combining a liquid polymer material and a foaming agent to form a foamed polymeric material, and separating the foamed polymeric material into a plurality of bristles. The foaming agent is configured to impart a porosity to the polymeric material, where the porosity is characterized by a density in the range of 0.3 to 1.2 g/cm³.

17 Claims, 9 Drawing Sheets

(51) Int. Cl.
*A46D 1/00* (2006.01)
*B24D 13/14* (2006.01)

(52) U.S. Cl.
CPC .............. *B24D 13/145* (2013.01); *C08J 9/04* (2013.01); *C08J 2375/02* (2013.01); *C08J 2375/04* (2013.01)

(56) References Cited

U.S. PATENT DOCUMENTS

| | | | |
|---|---|---|---|
| 5,679,067 A * | 10/1997 | Johnson | A46B 3/005 |
| | | | 451/527 |
| 5,849,052 A * | 12/1998 | Barber, Jr. | B24D 3/28 |
| | | | 51/298 |
| 6,126,533 A * | 10/2000 | Johnson | A46B 3/005 |
| | | | 451/359 |
| 6,312,485 B1 * | 11/2001 | Kaiser | B24D 3/22 |
| | | | 451/527 |
| 6,986,705 B2 | 1/2006 | Preston et al. | |
| 7,291,063 B2 | 11/2007 | Swisher et al. | |
| D560,458 S * | 1/2008 | McLain | D8/70 |
| 7,716,778 B2 * | 5/2010 | Meister | B24D 13/12 |
| | | | 15/230 |
| 8,291,541 B2 | 10/2012 | Delaere et al. | |
| 8,920,571 B2 | 12/2014 | Benson | |
| 9,050,697 B2 | 6/2015 | Daskiewich | |
| 9,102,029 B2 * | 8/2015 | Palushaj | A46B 13/008 |
| 9,226,569 B2 | 1/2016 | Vetter | |
| 9,415,480 B2 * | 8/2016 | Aoki | B24B 37/245 |
| 9,415,483 B2 * | 8/2016 | Krause | B24D 13/20 |
| 9,440,326 B2 | 9/2016 | Muncy et al. | |
| 9,649,741 B2 | 5/2017 | Daskiewich et al. | |
| 9,839,992 B2 | 12/2017 | Xue et al. | |
| 10,058,973 B2 | 8/2018 | Matsushita et al. | |
| 10,159,331 B2 | 12/2018 | Akashi et al. | |
| 10,219,612 B2 | 3/2019 | Urfer et al. | |
| 2003/0049995 A1 * | 3/2003 | Schutz | B24D 3/004 |
| | | | 451/41 |
| 2003/0153780 A1 * | 8/2003 | Haniff | A62D 1/0057 |
| | | | 558/199 |
| 2004/0209066 A1 | 10/2004 | Swisher et al. | |
| 2005/0107017 A1 * | 5/2005 | Fioratti | B24D 3/22 |
| | | | 451/526 |
| 2005/0120500 A1 * | 6/2005 | McLain | A46B 13/001 |
| | | | 15/230 |
| 2005/0188491 A1 * | 9/2005 | McLain | A46B 13/001 |
| | | | 15/230 |
| 2006/0035573 A1 * | 2/2006 | Preston | B24B 37/24 |
| | | | 451/526 |
| 2008/0182488 A1 * | 7/2008 | Frost | A46B 13/006 |
| | | | 451/177 |
| 2008/0242822 A1 * | 10/2008 | West | C08G 18/6446 |
| | | | 527/204 |
| 2009/0029097 A1 * | 1/2009 | Riddle | C08G 18/2815 |
| | | | 428/95 |
| 2014/0106652 A1 * | 4/2014 | Itoyama | C08J 9/12 |
| | | | 451/533 |
| 2014/0242894 A1 * | 8/2014 | Itoyama | B24B 37/24 |
| | | | 451/548 |
| 2015/0258660 A1 * | 9/2015 | Wasilczyk | B24D 3/28 |
| | | | 51/298 |
| 2017/0028526 A1 | 2/2017 | Wasilczyk et al. | |
| 2018/0134918 A1 * | 5/2018 | Daskiewich | C09G 1/16 |

* cited by examiner

POROUS POLYMERIC POLISHING BRISTLES AND METHODS FOR THEIR MANUFACTURE

CROSS-REFERENCE TO RELATED APPLICATIONS

This application claims the benefit of U.S. Provisional Patent Application No. 62/672,524 filed May 16, 2018 titled "POROUS POLYMERIC POLISHING BRISTLES AND METHODS FOR THEIR MANUFACTURE", the disclosure of which is incorporated herein by reference in its entirety.

FIELD OF DISCLOSURE

The present disclosure generally relates to manufacturing methods and resulting materials such as brushes, bristles, and pads suitable for use as polishing media. More particularly, the disclosure relates to porous, polymer-based bristles used to construct brushes and pads for polishing workpieces having non-planar features, such as cell phone display screens exhibiting beveled or curved edges.

BACKGROUND OF THE DISCLOSURE

Polishing media such as pads are useful in a variety of applications including polishing glass workpieces by moving the pad relative to the workpiece (e.g., glass, Si wafer, Sapphire wafer, etc.) being polished. This relative movement may be created by a rotating the polishing pad, by rotating the object being polished, or a combination of such movements. Other linear or any useful relative motion may be used between the polishing pad and the object being polished. A force may be applied to press the polishing pad in contact with the workpiece. The polishing may be performed to varying degrees such as to remove larger imperfections, to achieve a mirror finish and/or final flatness.

The polishing pad can be, for example, a polyurethane polishing pad. Typical polyurethane polishing pads are designed to be attached to a planar platen for polishing a planar workpiece. However, increasingly, specialty glass workpieces are being used that have non-planar surfaces or that have surfaces comprising non-planar portions. Unfortunately, standard polyurethane polishing pads cannot effectively polish a non-planar workpiece. One of the reasons that typical polishing pads are unacceptable for non-planar workpieces is that they do not provide even polishing over the entire surface. Standard polishing pads are generally unable to maintain contact with the entire surface area of the non-planar workpiece. Therefore, over certain portions of the workpiece's surface, they are unable to remove scratches (relics of the workpieces' lapping process) or other imperfections. Additional advantages obtained from polishing include removing a damaged layer, thinning the material to reduce its weight and make it more bendable, and improve surface finish and tactile "feel" of the material.

In the ordinary course of polishing a non-planar surface with a planar polishing pad, the polishing pad will not be able to compress enough to effectively contact the entire surface area of the workpiece. The use of compressible planar polyurethane foam or a stacked, planar foam composite may help provide additional coverage, but still does not contact all surface areas in cases of significant curvature. See, for example, U.S. Pat. No. 9,440,326 issued Sep. 13, 2016 and entitled "Non-planar Glass Polishing Pad and Method of Manufacture," the entire disclosure of which is hereby incorporated by this reference. Use of typical polishing pads can work well to remove material from a planar surface. However, such polishing pads are generally not well suited to polish workpieces with nonplanar (e.g., curved) surfaces, such as rounded edges, or surfaces with other features thereon. Accordingly, improved polishing media and methods are desired.

SUMMARY OF THE DISCLOSURE

Various embodiments of the present disclosure relate to polymeric bristles assembled into a polishing brush or pad, and methods for their manufacture. While the ways in which exemplary embodiments of the present disclosure address drawbacks of prior polishing media are discussed in more detail below, in general, various embodiments of the disclosure provide polishing bristles derived from porous polymer-based materials. Exemplary bristles and brushes can be used to polish relatively hard materials, such as glass, semiconductor materials and materials used in the fabrication of electronic devices, as well as materials having a hardness greater than the hardness of typical glass—e.g., toughened aluminosilicate glass or sapphire as well as metals.

To polish a workpiece having a non-planar surface, a polishing medium such as a brush made from densely packed bristles, is placed adjacent to the workpiece and moved relative to the workpiece surface. This relative movement can be created by: linear movement of the workpiece relative to the brush; rotating the brush; rotating the workpiece; orbital movement of the workpiece or brush; or a combination of such movements. A force can be applied to press the brush against the workpiece surface during the lapping or polishing process. A slurry, including abrasive particles, can also be used during the processing to facilitate material removal from the workpiece surface.

In accordance with additional embodiments of the disclosure, a method of manufacturing polymeric bristles is provided. An exemplary method includes the steps of mixing a pre-polymer, a curative, and a foaming agent (to impart porosity) to thereby form a polymer-based cake suitable for cutting into individual bristles (or groups of bristles) of desired size and shape and attaching the bristles to a plate, platen, or the like for use as a polishing brush or pad. Alternatively, the polymeric material may be extruded or otherwise formed into a continuous strand having a desired cross section, and cut into discrete lengths. Exemplary methods can further include adding in the range of 1% to 9% polyol into the mixture. Other exemplary methods are described below.

Further exemplary embodiments of the disclosure include a method of removing material from a workpiece surface using porous bristles as described herein, a polishing apparatus as described herein, and/or polishing system as described herein.

BRIEF DESCRIPTION OF THE DRAWING FIGURES

A more complete understanding of the embodiments of the present disclosure may be derived by referring to the detailed description and claims when considered in connection with the following illustrative figures, and:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of materials, media, brushes, bristles, systems, apparatus, and methods of forming and using the bristles provided below is merely exemplary and is intended for purposes of illustration only; the following description is not intended to limit the scope of the disclosure or the claims. Moreover, recitation of multiple embodiments having stated features, compositions, or properties is not intended to exclude other embodiments having additional features, compositions, or properties, or other embodiments incorporating different combinations of the stated features, compositions, or properties, unless otherwise noted herein. Further, although generally described in the context of removing material from a surface, use of the materials, media, brushes, bristles, systems, apparatus, and methods is not so limited, unless otherwise noted. For example, the materials, media, brushes, bristles, systems, apparatus, and methods could be used to apply a coating (e.g., paint, adhesive, other compound, or the like) to a surface.

Exemplary materials, media, apparatus, and systems as described herein can be used to polish or otherwise remove material from surfaces of a workpiece, including a workpiece having a non-planar surface, a planar surface, or both. By way of examples, materials, media, apparatus, systems, and methods as described herein can be used to polish glass, such as display screens for hand-held devices, toughened aluminosilicate glass, semiconductor material, materials used to form electronic devices and/or hard-surface materials, such as sapphire (e.g., the A, C, or R planes of sapphire), other gem stones, such as emeralds and rubies, ceramics, plastics, semiconductors, metals, such as titanium, aluminum, steel, and similar materials. As used herein, the term "hard surface" or "hard-surface material" means a material having a hardness greater than the hardness of conventional hard silicate glass (e.g., greater than about 1550 HB Brinell scale or about 7 Moh's scale). For example, the materials, media, apparatus, and systems as described herein can be used to polish surfaces that have undergone grinding and/or lapping processes or for chemical-mechanical planarization processes and/or to control the thickness, shaping, surfacing, and/or smoothing of the workpiece.

By way of particular examples, the workpiece includes glass, such as toughened aluminosilicate glass, used in the manufacture of displays or covers for devices, such as smart phones or other personal electronic devices. The workpiece can include nonplanar surfaces, such as curved, beveled, or rounded edges, to provide a smooth surface and/or reduce a risk of chipping or cracking of the workpiece.

As noted above, typical polishing pads may not be particularly well suited for polishing curved edges of a workpiece. In contrast, various embodiments of brushes constructed from polymeric bristles (which may or may not be porous) and methods described herein can be used to polish surfaces that include nonplanar portions, such as curved edges, without compromising desired material removal rates from the workpiece surface.

Figure 7:
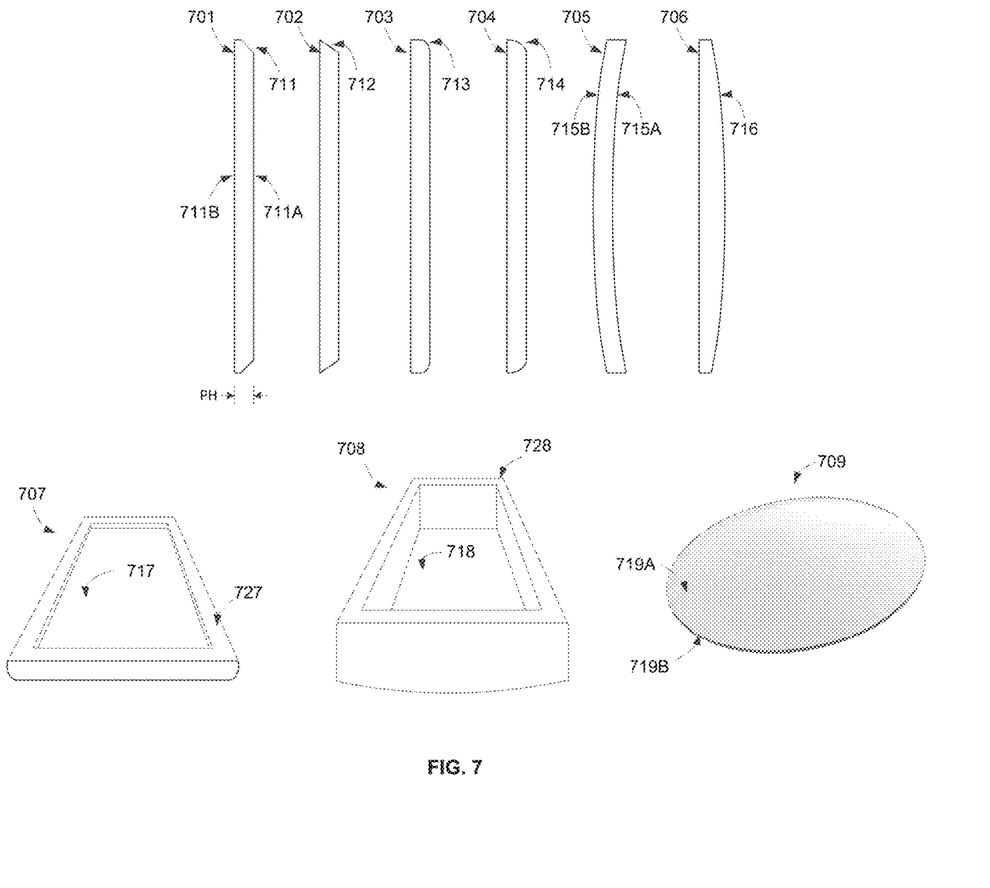
FIG. 7 illustrates exemplary workpieces in accordance with exemplary embodiments of the disclosure.

FIG. 7 illustrates various example nonplanar workpieces. Throughout this description, the term nonplanar workpiece is intended to describe a workpiece having at least one surface that comprises at least one portion of that surface that is not planar with regard to another portion of the workpiece. Similarly, the term nonplanar surface is intended to mean a surface that comprises at least one portion of that surface that is not planar with respect to another portion of the surface. In an example embodiment, a nonplanar surface comprises at least one portion of the surface that is planar (a planar portion), e.g., portion 711A, and at least one portion whose surface is not in the same plane as the surface of the planar portion 711A (a nonplanar portion), e.g., portion 711.

Thus, in an example embodiment, the workpiece to be polished may comprise a workpiece (e.g., workpiece 701, 702, 703, or 704) having a flat portion in the middle of the workpiece (e.g., portion 711A in workpiece 701) and nonplanar portions (e.g., portions 711, 712, 713, 714) near the edges of the workpiece. For example, an area of a workpiece near the edges could have a rounded edge with a radius of curvature (e.g., rounded edges 713, 714), a bevel (e.g., edges 711, 712), a taper, a parabolic shape (e.g., edge 714), a rounded shape, or the like. An edge portion of the surface of the workpiece can include any suitable nonplanar shape.

A workpiece can include an edge that is at a 90 degree angle to a top surface (e.g., surface 711A) and a bottom surface (e.g., surface 711B) and those surfaces (711A and 711B) are typically flat and parallel. In an example embodiment, curved workpieces may differ in that one or more surfaces have a curvature that is described by one of the following: (1) edges have a radius of curvature slightly larger than the part height ("PH") that then tapers into a surface that has a radius of curvature much larger than the PH which constitutes a nearly flat surface (the other surface is flat in this case); (2) one surface is flat with 90 degree edges that extend to approximately ½ of the PH where then a radius of curvature similar in size to the PH extends to the other surface where the remaining surface across the workpiece has a radius of curvature that is much larger than the PH and is nearly flat; and (3) one surface is flat and the other surface is made entirely of a curved surface (e.g., workpiece 706 and entirely curved surface 716) with a radius of curvature much larger than the PH. In each of the above three cases, the workpiece could have both sides curved in some combination of the above three examples. For example, workpiece 705 has both surfaces 715A, 715B curved over the entire surface of the workpiece. The glass workpieces, from a top (face) view could also be round, square, rectangular or some other geometry. In an example embodiment, the workpiece may have a non-continuous radius of curvature across an entire surface. Stated another way, the workpiece may have no planar portions.

In some embodiments, the workpiece to be polished may include surfaces that are set-back, inset, or otherwise offset relative to other surfaces located, for example, around the perimeter of the workpiece. Workpiece 707, for example, features a substantially planar surface 717 that is offset, by a small amount, from a surface 727 located on the same side of workpiece 707 as surface 717. In other embodiments, as illustrated with respect to workpiece 708, the internally offset surface 718 is displaced from the periphery surface 728 by a significant amount. In some embodiments, the workpiece does not have a generally rectangular shape (as shown in workpieces 707 and 708), but rather has a generally curvilinear shape, as illustrated in connection with workpiece 709. Workpiece 709 may correspond, for example, to an eyeglass lens having two opposing curved surfaces 719A and 719B.

In one example embodiment, PH is measured at the point of greatest thickness of the glass object before polishing. In another example embodiment, PH is less than or equal to the greatest thickness of the glass, but not less than the greatest minimum finished thickness of the glass. The PH can be, for example, from 0.01 inch to 1 inch or from 0.05 inch to 0.25 inch. Other part heights can also be used.

In accordance with various embodiments, porous polymeric polishing bristles may be secured to a plate, pad, platen, or the like, and used to polish nonplanar surfaces. Stated another way, the polymeric bristles are configured to remove evidence of lapping damage or otherwise remove material on the nonplanar portions as well as on any planar portions of the workpiece more effectively, compared to pads that are not so configured. Polymeric material (e.g., porous polymeric material) can comprise, consist essentially of, or consist of various components described below. Further, methods and/or apparatus comprise, consist essentially of, or consist of various steps or components described herein.

Figure 1:
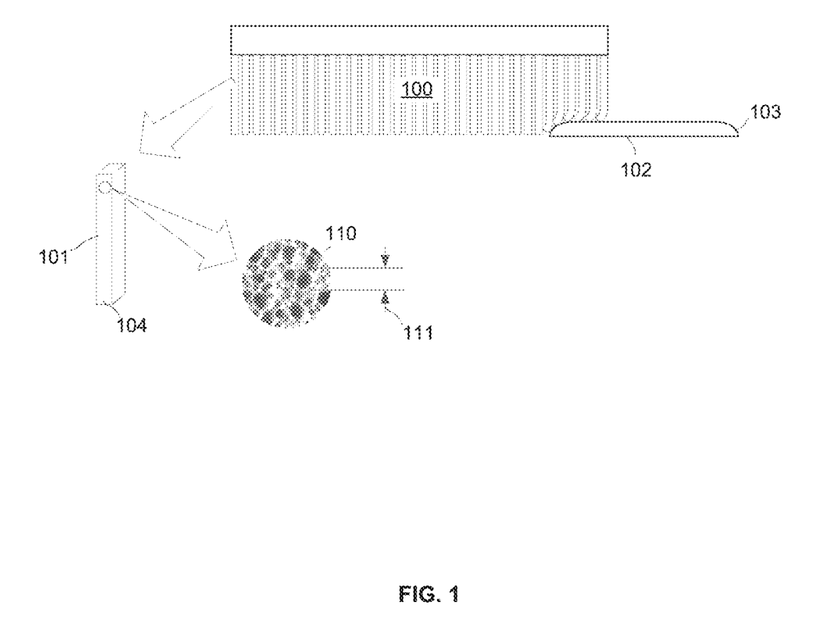
FIG. 1 illustrates a perspective view of a polishing brush interacting with a workpiece having a non-planar feature in accordance with various exemplary embodiments of the disclosure.

FIG. 1 illustrates polishing media or brush 100 in accordance with various examples of the disclosure. Polishing media 100 includes a plurality of bristles 101 each made from a polymer-based material 104. As described in greater detail below, the bristles may be cut from a cake of polymer or inorganic material, extruded as a strand and cut into discrete segments, or molded, stamped, or otherwise derived from a volume of material.

The polymer-based material 104 may also include one or more fillers, abrasives, and/or microballoons (e.g., microballoons available from Akzo Nobel, Amsterdam). Exemplary fillers and abrasives include one or more polymeric and inorganic fillers, such as (inorganic) calcium carbonate, barium sulfate, cerium oxides, silicon oxides, aluminum oxides, zirconia, iron oxides, manganese dioxides, kaolin clays, montmorillonite clays, titanium oxides, silicon carbides, boron carbides, and diamond; (polymeric) polyurethane foam, epoxy, polystyrene, polyacrylic, polyimide, nylon, Kevlar, Teflon or other thermoplastic or thermoset materials. A size of the inorganic filler/abrasive particles can range from about 0.001 microns to about 1000 microns, or about 0.5 microns to about 100 microns in average diameter.

Organic polymeric fillers can also include cylindrical fibers ranging from 50 to 50000 microns in length and 20 to 1000 microns in diameter. Fillers can also include glass or polymeric microspheres and microballoons. The polymer-based material 104 can include 0 to about 80 wt. % filler/abrasive. Exemplary organic inorganic filler/abrasive loading ranges from about 15 wt. % to about 30 wt. % or about 20 wt. % to about 25 wt. % by weight of the polymer-based material.

In the illustrated example, polymer-based material 104 may comprise, consist essentially of, or consist of one or more of a polyurea, a polyurethane, and a polyurethane/polyurea hybrid material, any of which can be foamed. Polymer material 104 may be formed into bristles from a bulk (e.g., cakes or sheets) of material—such as material typically used to form polishing pads (e.g., new or used polishing pad material), which may be foamed. In the present case, the bristles can be formed by cutting, stamping, molding, extruding, or otherwise converting the bulk polishing material into either discrete bristles or into a bulk cake of polishing material having bristles extending therefrom.

In various embodiments, bristles 101 and/or polymer-based material 104 are referred to herein as porous, in that they embody pores 110 which may be characterized by a pore diameter (or mean pore diameter) 111, for example on the order of 10 microns to several (e.g., 3 or more) millimeters. As used herein, pores can refer to voids or vacancies in material formed using, for example, foaming agents or techniques (e.g., introduction of a gas) and/or microballoons. Additionally or alternatively, a pore can be defined as having a substantially spherical or ellipsoid or dumbbell shape. During polishing, it is proposed that these pores may facilitate removal rate by delivering abrasive particles (on the order of 10 microns) contained in the slurry to local material removal sites on a workpiece 102 having one or more non-planar surfaces 103.

Various methods for manufacturing the polymer-based material from which the bristles are made are discussed in the following patents and patent applications, the entire disclosures of which are hereby incorporated into this disclosure by this reference to the extent such contents do not conflict with the present disclosure: i) U.S. Pat. No. 9,440,326 issued Sep. 13, 2016 and entitled "Non-planar Glass Polishing Pad and Method of Manufacture"; ii) U.S. Pat. No. 9,649,741 issued May 16, 2017 and entitled "Polishing Material for Polishing Hard Surfaces, Media Including the Material, and Methods of Forming and Using Same"; iii) U.S. Pat. No. 9,050,697 issued Jun. 9, 2015 and entitled "Self-conditioning Polishing Pad and a Method of Making the Same"; iv) U.S. Publication 2017/0028526 published Feb. 2, 2017 and entitled "Polymeric Lapping Materials, Media and Systems Including Polymeric Lapping Material, and Methods of Forming and Using Same"; v) U.S. Publication 2015/0258660 published Sep. 17, 2015 and entitled "Polyurea-Based Material, Polishing and Grinding Including the Polyurea-Based Material, and Methods of Forming and Using Same"; and vi) U.S. application Ser. No. 15/808643, filed Nov. 9, 2017 and entitled Soft Polymer-Based Material Polishing Media. Further, the polymer-based material can include any combination of polishing, lapping, and/or soft polymer-based material disclosed in these references.

Figure 2:
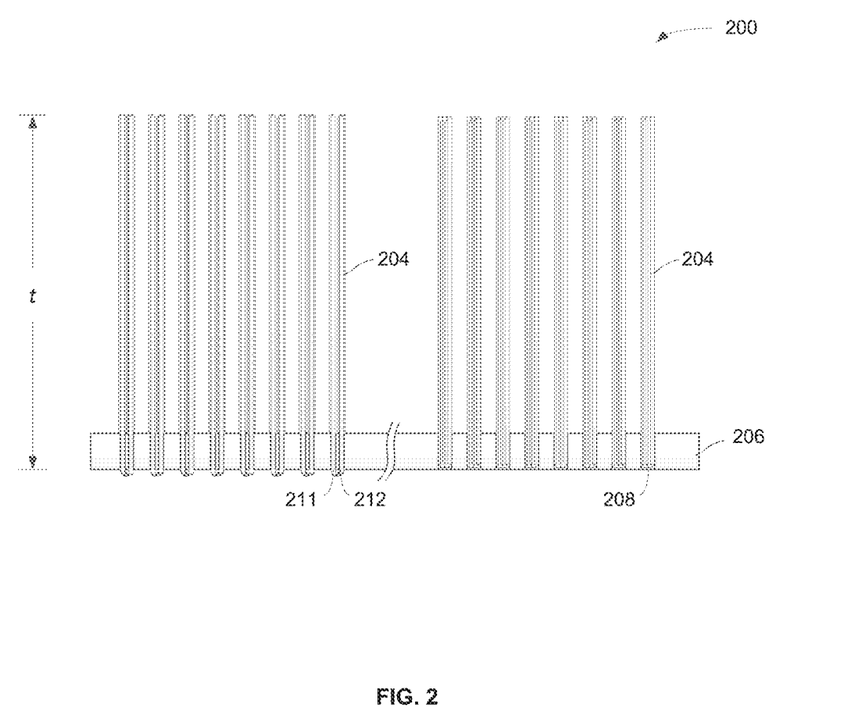
FIG. 2 illustrates a front elevation close up view of a polishing brush showing bristles secured directly to a plate in accordance with additional exemplary embodiments of the disclosure.

FIG. 2 illustrates two embodiments (in a side-by-side, cut-away view) of a polishing medium 200, which includes bristles 204 extending from a rigid or flexible plate 206. Although not separately illustrated, the bristles in accordance with at least one embodiment of the disclosure can include abrasive particles, microballoons, and various other constituents to fine tune the mechanical properties of the bristles. Exemplary lengths of the bristles 204 range from 0.3 inches to 14 inches, or 1.0 inch to 2.5 inches, and preferably about 1 inch as measured from a surface of a plate 206 or other surface to which the bristles 204 are attached or otherwise secured. A cross-sectional shape of the bristles can include a circle, ellipse square, rectangle, star, cross, triangle, or the like. An effective diameter of each bristle can range from 0.1 mm to 6 mm, or 0.5 mm to 4.0 mm, or 2.5 mm to 3.5 mm. A shape of a side profile (length) can be rectangular, triangular, or tapering. Bristles 204 can extend 0.1 to 2.0 inches from the surface of plate 206. Bristles 204 can comprise, consist of, or consist essentially of one or more of polyester, polyethylene, polypropylene, nylon and its various grades, animal hair, cut sections of nonwoven sheets, cut sections of polishing pads, polyurethane elastomer, and the like. Additionally or alternatively, bristles 204 and/or other bristles described herein can include a base material onto which a resilient polymer material, such as the polymer material described herein, can be coated.

In some embodiments, as illustrated to the left in FIG. 2, plate 206 includes pairs of holes or openings (e.g., holes 211 and 212), through which groups of bristles (e.g., 6-10 individual bristles per group) may be sewn or threaded and folded back to form the polishing medium 200. In another embodiment, as illustrated to the right in FIG. 2, plate 206 includes holes or openings (e.g., hole 208) into which groups of bristles (e.g., 6-10 individual bristles) are at least partially inserted to thereby secure the groups of bristles 204 to form the polishing medium 200. In addition to the interference fit provided by holes 211, 212, and 208, one or more adhesives and/or other components (not illustrated) may be used to further secure bristles 204 to plate 206. It will be appreciated that FIG. 2 is not necessarily drawn to scale, and that the spacing, size, and locations of the various openings and bristle groups may vary depending upon various factors, such as the nature and size of the article being polished. Alternatively, the bristles and the base plate from which they extend may be formed from a single, integral block of material (e.g., using an injection molding, other casting technique, or cutting of material).

In accordance with various embodiments, the bristles may be configured to polish any planar or non-planar surface, as well as workpieces having a combination of both planar and non-planar surfaces. Moreover, the bristle length, effective width, and morphological features of the bristles may be adapted to the size and shape of the workpiece. For example, the effective length of the bristles may be at least as long as the height of the workpiece being polished, with the bristle diameter adjusted accordingly to provide adequate stiffness.

Figure 3:
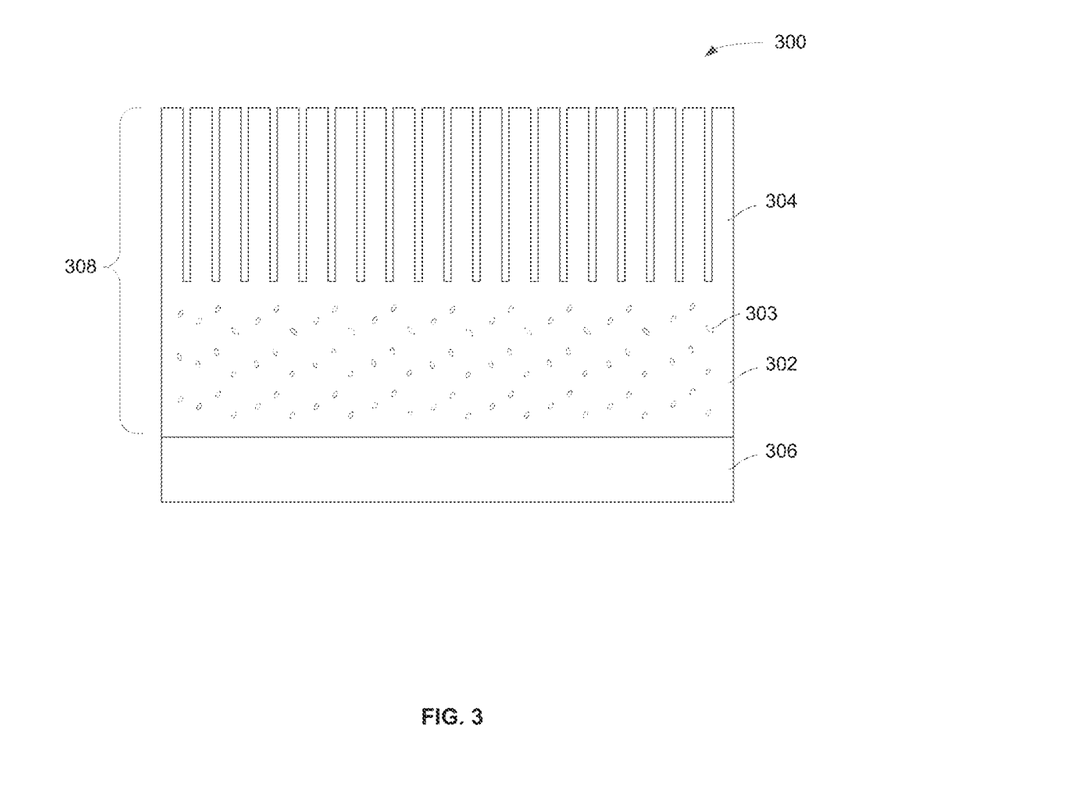
FIG. 3 illustrates an alternate view of a polishing brush showing bristles secured to a plate and further including a supplemental polishing medium between the distal ends of the bristles and the plate in accordance with further exemplary embodiments of the disclosure.

FIG. 3 illustrates a polishing apparatus 300 in accordance with at least one embodiment of the disclosure. Polishing apparatus 300 includes a plate 306 and polishing media 308. In the illustrated example, polishing media 308 includes polymer-based material 302 and bristles 304 (which can be the same or a different material as polymer material 104 and/or bristles 204).

Plate 306 and plate 206 can include any suitable material, such as plastic; for example, one or more of polypropylene, polyethylene, polycarbonate, polyamide, polyimide or other common rigid engineering plastics, or a metal. Plate 306 can be used to provide structural support for polishing medium 308. Holes or apertures can be formed within plate 306 (e.g., as shown in FIG. 2) to facilitate attachment of bristles thereto and/or adhesion of polymer-based material 302 to plate 306. The polymer-based material 302 and/or the bristles 304 may include various fillers, abrasives, and/or microballoons 303 as discussed above in connection with FIG. 1.

As described in greater detail below, polymeric bristles may achieve higher material removal rates if they exhibit porosity, which may be imparted to the polymer material by adding a foaming agent or otherwise reducing the density below that of a completely solid, non-porous material. In this regard, references to the density of the bristle material are understood to refer to the density of the polymer material prior to the addition of any particulates or fillers, as described above.

Figure 4:
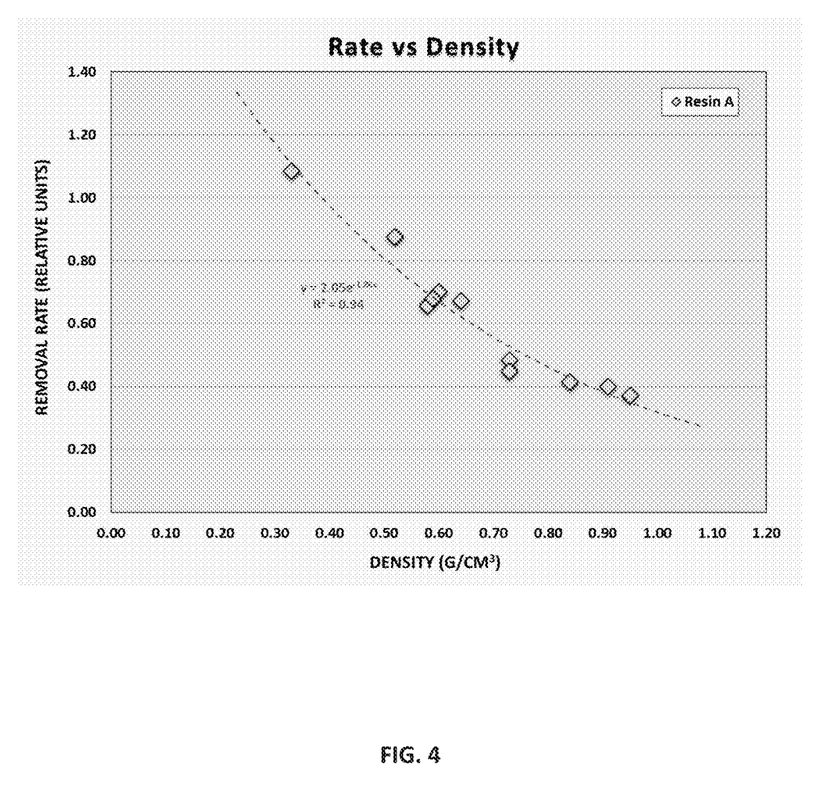
FIG. 4 illustrates a graph of removal rate versus bristle density in accordance with exemplary embodiments of the disclosure.

FIG. 4 is a graph illustrating material removal rate or MRR (also referred to as stock removal rate or SRR, that is, the rate at which material is removed from an exemplary workpiece), versus the density of the polishing bristle material.

The data shown in FIG. 4 demonstrate that lower density bristle materials can be advantageous in that they tend to yield higher material removal rates (MMR). For example, bristle material densities in the range of 0.25 to 1.15 $g/cm^3$, and particularly in the range of 0.3 to 0.8 $g/cm^3$, and more particularly in the range of 0.4 to 0.7 $g/cm^3$, and most particularly in the range of 0.5 to 0.6 $g/cm^3$ have been observed to yield material removal rates in the range of 0.06 to about 0.16 (and particularly in the range of 0.8 to 0.12 arbitrary units) for substrates (workpieces) having material properties generally analogous to glass resistance displays of the type used in mobile telephones. In addition, as described below, lower density bristle materials tend to promote greater lifetime resistance to impulse breakage (also known as breakage survival).

Figure 5:
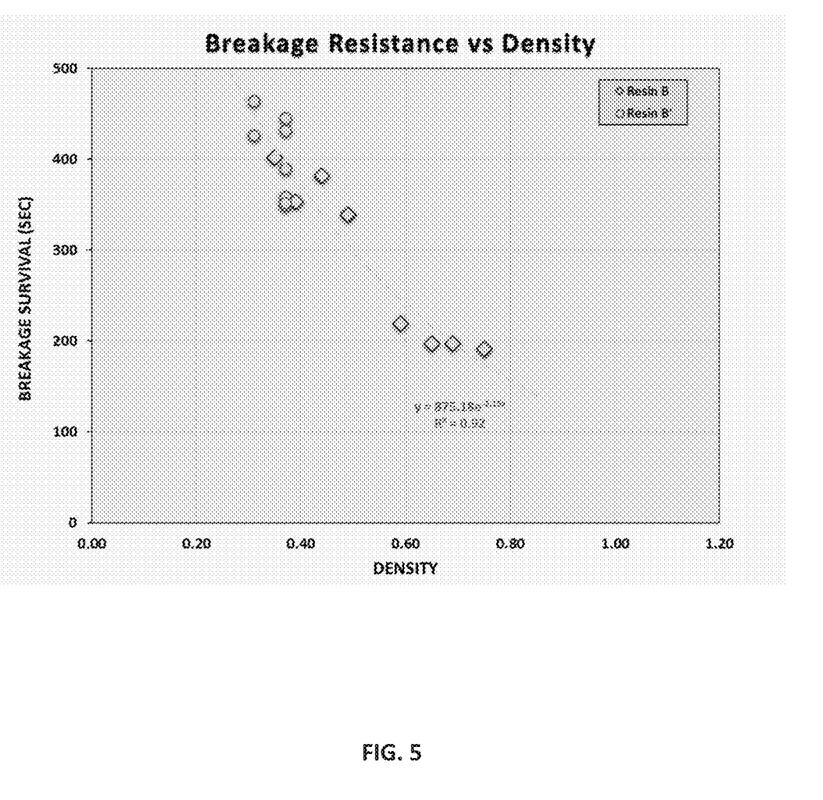
FIG. 5 illustrates a graph of lifetime breakage versus bristle density for two bristle materials in accordance with exemplary embodiments of the disclosure.

More particularly, FIG. 5 is a graph illustrating breakage survival versus bristle density for two exemplary bristle materials. As shown, bristle material densities in the range of 0.3 to 0.7 $g/cm^3$, and particularly in the range of 0.4 to 0.6, have been shown to exhibit high speed rotary impact survival values in the range of 200 to 500 SEC (seconds).

In contrast to the higher removal rates and higher breakage values achieved using lower density bristle materials, it has also been observed that lower density bristle materials tend to exhibit lower wear resistance; that is, the bristles tend to degrade faster.

Figure 8:
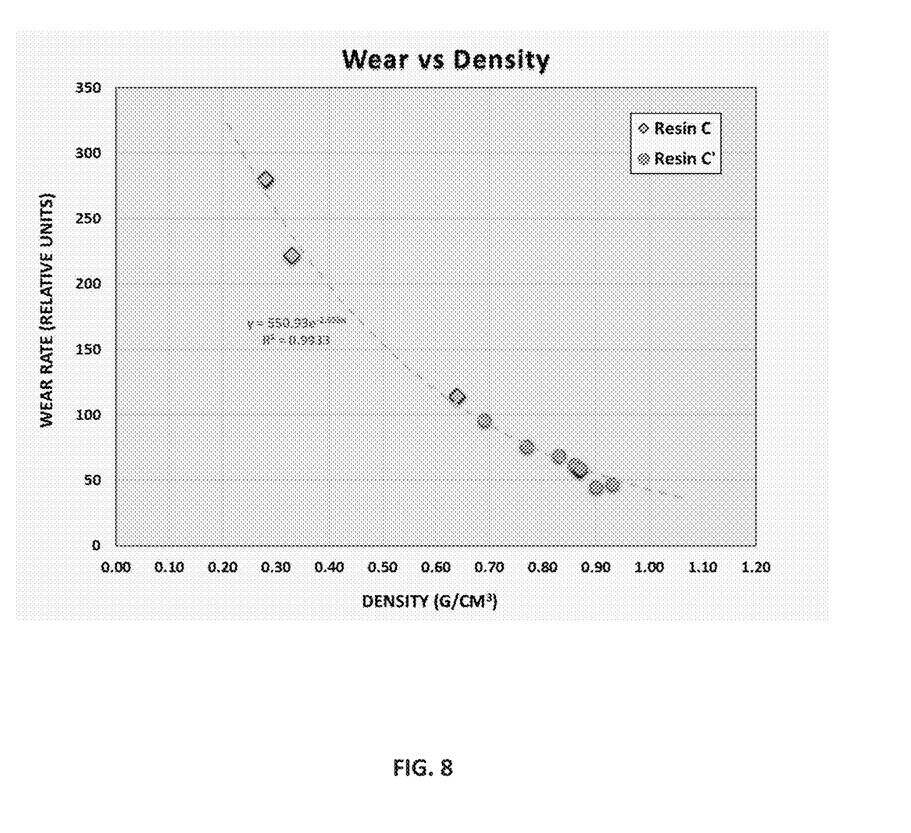
FIG. 8 is a graph of wear rate versus density for two bristle materials in accordance with exemplary embodiments of the disclosure.

More particularly, FIG. 8 is a graph illustrating Taber wear rate versus bristle material density for two exemplary bristle material compositions. In the context of FIG. 8, the wear rate refers to a bristle's loss in mass or thickness (typically expressed in milligrams or millimeters removed) per number of cycles of abrasion (typically per thousand or ten thousand cycles). (See, ASTM D1044 and ASTM D4060). As shown, bristle material densities in the range of 0.3 to 0.8 $g/cm^3$, and particularly in the range of 0.4 to 0.6 $g/cm^3$, have been shown to exhibit wear rates in the range of 40 to 300 microns/hr.

Figure 9:
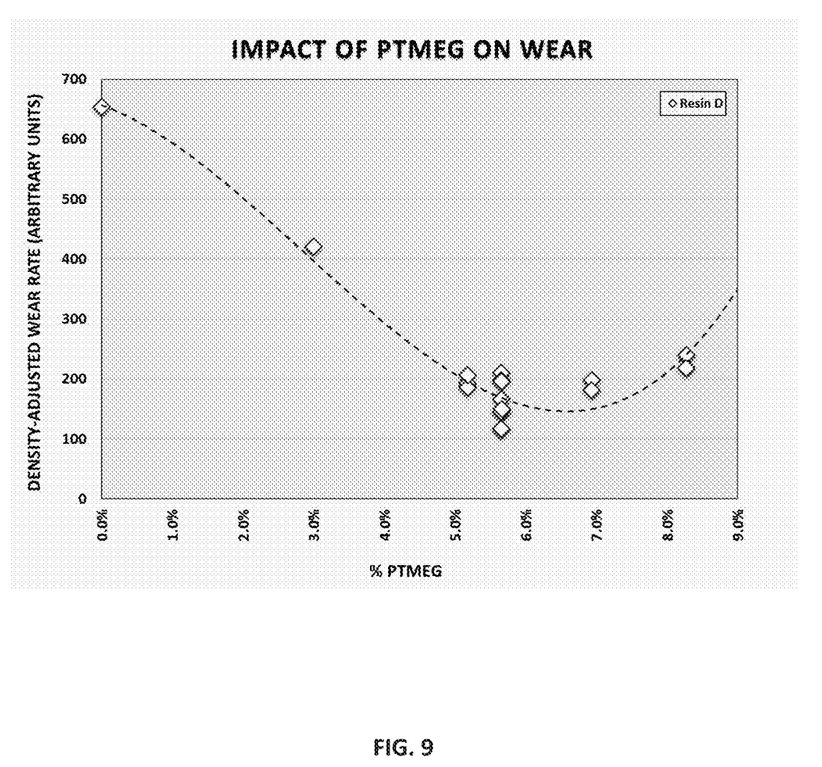
FIG. 9 is a graph of wear rate versus polyol concentration in accordance with exemplary embodiments of the disclosure.

With momentary reference to FIG. 9, the present inventors have also observed that a bristle material's wear resistance may be improved by incorporating additional polyol (e.g., in the form of PTMEG) into an isocyanate (NCO) prepolymer prior to combining the NCO with a curative. In this context, the supplemental polyol is separate from any polyol which is typically included as part of the liquid NCO prepolymer. FIG. 9 shows that wear resistance may be increasingly enhanced by incorporating PTMEG into the polymer used to make the bristle material in the range of 1% to 9% by weight of total solution (that is, the prepolymer, curative, and polyol combined).

Those skilled in the art will appreciate that polishing media are often rated or characterized in terms of three primary criteria: i) MRR; ii) wear rate; and iii) breakage. Depending on particular use cases, the desired values for these criteria may vary widely. It is thus possible to "tune" bristle properties to optimize their performance for particular applications.

In this regard, FIGS. 4, 5, 8, and 9 suggest that bristles made from lower density materials tend to exhibit higher removal rates and greater breakage resistance values, but also tend to exhibit higher wear rates (corresponding to lower wear resistance). In accordance with one aspect of the invention, the density of the material from which the bristles are made may be selected to optimize the bristles for use in their intended polishing environment. For example, if a particular polishing application requires a high removal rate and/or a high breakage resistance value but does not require a high wear resistance (such as when the polishing operation may be completed before the bristles undergo significant degradation), relatively low density materials may be employed (e.g., in the range of 0.2 to 0.6 g/cm$^3$). In contrast, for polishing applications requiring bristles with high wear resistance (corresponding to longer polishing times) but which do not require high MMR and/or high breakage resistance values, correspondingly higher density bristle materials may be employed (e.g., in the range of 0.5 or 0.6 g/cm$^3$ or above).

Various techniques may be employed to impart a desired porosity to the polymeric bristle material by controlling the density of the bristle material, for example by incorporating foaming agents, blowing agents, and/or microballoons into the polymeric material to influence porosity and, in particular, the size of the pores (often expressed in terms of mean diameter pore size). In various embodiments, the polymer material may be characterized by pore sizes in the range of 10 microns to 1 millimeter. In addition, the polymeric material may also include one or more surfactants (including fluorosurfactants).

Those skilled in the art will appreciate that the foregoing use cases are merely exemplary, and are intended to illustrate the notion that the composition of the bristle material, the relative concentrations of the various constituent components of the material, as well as the material density of the material may be configured to "tune" the morphology (particularly density and pore size) of the resulting bristles to optimize their effectiveness in their intended operating environment.

Figure 6:
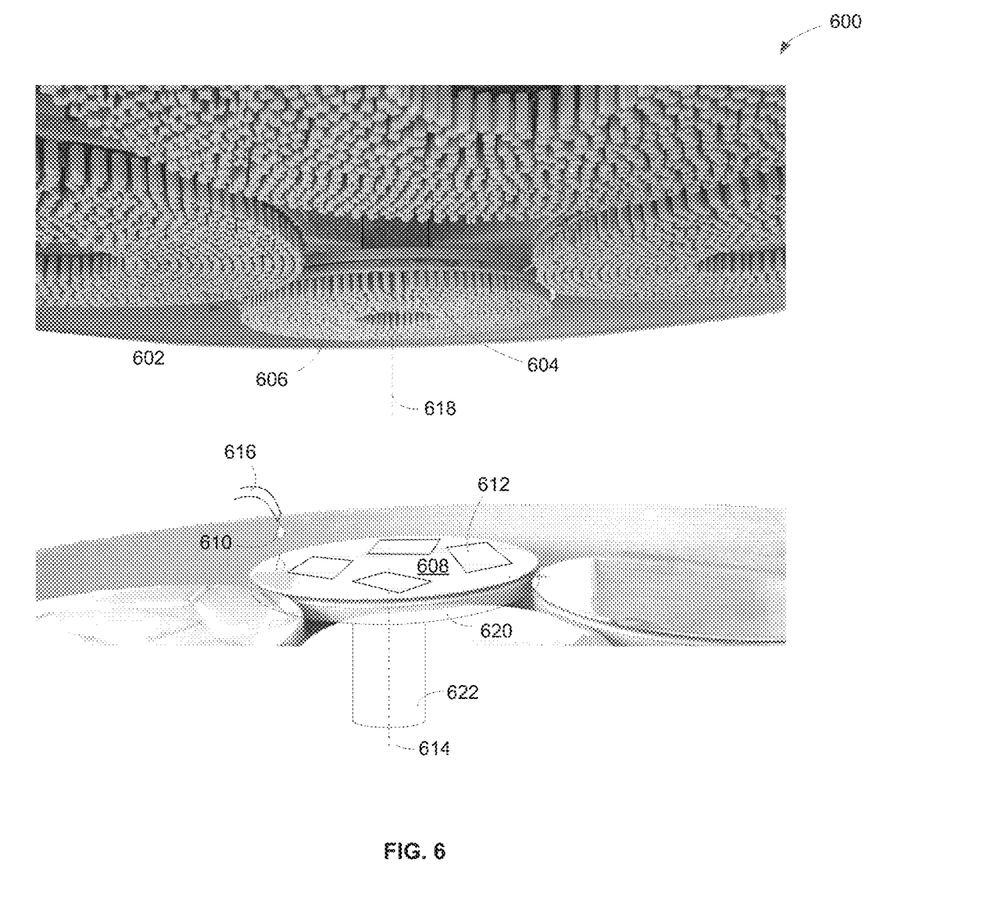
FIG. 6 illustrates a polishing system in accordance with exemplary embodiments of the disclosure.

FIG. 6 illustrates an exemplary polishing system 600 in accordance with embodiments of the disclosure. Polishing system 600 can be used for polishing a workpiece 612—e.g., a workpiece having one or more profiles illustrated in FIG. 7. Polishing system 600 includes an apparatus 602, a carrier 608, and slurry 610, which can be dispensed from an optional slurry dispenser 616. Polishing system 600 can also include a plate 62o and/or a rotational arm 622. Apparatus 602, carrier 608, and slurry dispenser 616 can form part of a polishing machine or polisher.

Apparatus 602 includes a platen or plate 604 and one or more brushes 606 removably attached to platen 604. Apparatus 602 can rotate about an axis 618, as illustrated, and/or can perform other relative movement with respect to the workpiece 612 surface. In the illustrated embodiment, the brush 606 has a diameter in the range of 500 millimeters.

Carrier 608 can be configured to retain one or more workpieces (e.g., 612) during a polishing process. The carrier can include teeth that engage with, e.g., a platen of polishing system 600. Carrier 608 can rotate about axis 614, about axis 618, or employ other suitable movement. Carrier 608 can be formed of any suitable material. By way of examples, carrier 608 is formed of stainless steel and/or fiberglass.

The materials described herein from which the bristles (e.g., for medium/brush 606) are made can be formed in a variety of ways, and may comprise one or more of a polyurea, a polyurethane, and a polyurethane/polyurea hybrid material, any of which can be foamed or otherwise configured to achieve a desired density.

Those skilled in the art will appreciate that suitable polymeric bristle materials may be made by combining a prepolymer (e.g., comprising, e.g., an isocyanate(NCO)) with a suitable curative, such as a hydroxyl (OH) or an amine (NH$_2$) based curative. The NCO may be any suitable prepolymer such as an MDI (methylene diphenyl diisocyanate) or TDI (toluene diisocyanate) polyether, or an MDI or TDI polyester. If desired, additional polyol (e.g., PTMEG) in the range of 2% to 9% by total weight may be added to the prepolymer immediately before combining it with the curative.

In various embodiments, the finished polymer cake may be cut into bristles which may be assembled together in a generally parallel arrangement and secured at one end of a plate to form a flexible brush. Exemplary lengths of the bristles range from 0.5 inch to 4 inches, or 1.0 inch to 3.0 inches or 2.0 inches to 2.5 inches, inches as measured from a surface of the plate or substrate to which the bristles are attached. A cross-sectional shape of the bristles can include a circle, square, rectangle, star, cross, triangle, or the like. An effective diameter of each bristle can range from 0.1 mm to 6 mm, or 0.5 mm to 4.0 mm, or 2.5 mm to 3.5 mm. A shape of a side profile (length) can be rectangular, triangular, tapered, or irregular. In a preferred embodiment, the bristles are about 3 mm thick and about 25 mm long.

In various embodiments the plate may be made from a plastic, such as polypropylene, polyethylene, polycarbonate, polyamide, polyimide or other common rigid or flexible engineering plastics, or a metal.

A polishing medium is provided which includes a plurality of porous polymeric bristles.

A polishing brush is provided which includes a plurality of bristles, wherein: each bristle comprises a porous polymeric material; each bristle comprises a constrained proximal end and an unconstrained distal end; and each bristle is disposed substantially parallel to the other bristles. In this context, substantially parallel can mean within 30 degrees, within 25 degrees, within 10 degrees, within 5 degrees, or within one degree angle between the bristles.

An apparatus is also provided for polishing a workpiece of the type characterized by at least one non-planar surface. The apparatus includes a base, and a plurality of bristles secured to and extending (e.g., substantially parallel and/or orthogonally) from the base. The apparatus can include, for example outer bristles configured to extend at an acute angle relative to the interior bristles, to facilitate polishing corners or other tight spaces of a workpiece. In an embodiment, each bristle comprises a porous polymeric material. Other bristle configurations are also contemplated by the present disclosure.

In an embodiment, the polymeric material comprises at least one of a polyurea, a polyurethane, and a polyurethane/polyurea hybrid material.

In an embodiment, the polymeric material comprises one of a polyester polyurethane and a polyether polyurethane.

In an embodiment, the polymeric material comprises a density in the range of 0.3 to 1.2 g/cm$^3$.

In an embodiment, the polymeric material comprises a density in the range of 0.4 to 0.7 g/cm³.

In an embodiment, the polymeric material is characterized by pores having a mean diameter in the range of 10 microns to 1 millimeter.

In an embodiment, the polymeric material further comprises polyether polyol in the range of 1% to 8% by weight.

In an embodiment, the polymeric material is foamed.

In an embodiment, the polymeric material comprises one of an MDI (methylene diphenyl diisocyanate) and a TDI (toluene diisocyanate) type polyether polyurethane.

In an embodiment, the polymeric material comprises one of an MDI and a TDI type polyester polyurethane.

In various embodiments, the polymeric material may include none, one, or two or more surfactants.

In an embodiment, at least one of the surfactants comprises a fluorosurfactant.

In an embodiment, each bristle has a length in the range of 1 to 3 inches, and an effective diameter in the range of 0.5 to 4 millimeters.

A method is provided for manufacturing bristles for use in polishing a workpiece which may include a non-planar surface. The method includes the steps of combining a liquid polymer material (e.g., formed via a combination of a prepolymer and a curing agent or the like). Exemplary methods can further include forming pores, such as by use of a a foaming agent, other foaming technique, used of a base material, and/or use of microballoons to form a volume of foamed polymeric material, and thereafter separating the volume of polymeric material into a plurality of bristles. The foaming agent may be configured to impart a density to the polymeric material in the range of 0.3 to 1.2 g/cm³.

In an embodiment, the polymeric material is characterized by pores having a mean diameter in the range of 10 microns to 1 millimeter.

In an embodiment, the polymeric material comprises at least one of a polyurea, a polyurethane, and a polyurethane/polyurea hybrid material.

In an embodiment, the combining step further comprises adding polyether polyol in the range of 1% to 8% by weight.

In an embodiment, the pre-polymer comprises one of an MDI (methylene diphenyl diisocyanate) polyether polyurethane, a TDI (toluene diisocyanate) polyether polyurethane, and MDI polyester polyurethane, and a TDI polyester polyurethane.

In an embodiment, the method further includes securing the plurality of bristles to a plate to form a polishing brush, and attaching the polishing brush to a rotary (e.g., polishing) platen.

A polishing bristle is provided which is made from the foregoing method.

A polishing brush is provided which includes a base plate and a plurality of bristles extending from the base plate. In an embodiment, each bristle comprises a foamed polymeric material characterized by: i) pores having a mean diameter in the range of 10 microns to 1 millimeter; and ii) a density in the range of 0.3 to 1.2 g/cm³.

Although exemplary embodiments of the present disclosure are set forth herein, it should be appreciated that the disclosure is not so limited. For example, although materials, media, apparatus, systems, and methods are described in connection with lapping hard-surface materials, the invention is not so limited—unless otherwise stated. In addition, the bristles described herein may be used for other purposes besides polishing, such as, for example, applying a coat of liquid to a surface, or cleaning a surface without removing material from the surface. Various modifications, variations, and enhancements of the materials, methods, and media set forth herein may be made without departing from the spirit and scope of this disclosure.

The invention claimed is:

1. A polishing brush comprising:
a plate comprising opening; and
a plurality of bristles, wherein:
each bristle of the plurality of bristles comprises a porous polymeric material; and
each bristle of the plurality of bristles comprises a constrained proximal end within the opening and an unconstrained distal end,
wherein each bristle of the plurality of bristles is secured to the plate and extends from the plate substantially parallel to the other bristles of the plurality of bristles, and wherein each bristle is sewn into the plate.

2. The polishing brush of claim 1, wherein the polymeric material comprises one of a polyester polyurethane and a polyether polyurethane.

3. The polishing brush of claim 1, wherein the polymeric material is foamed.

4. A polishing brush comprising:
a plate comprising opening; and
a plurality of bristles, wherein:
each bristle of the plurality of bristles comprises a porous polymeric material; and
each bristle of the plurality of bristles comprises a constrained proximal end within the opening and an unconstrained distal end,
wherein each bristle of the plurality of bristles is secured to the plate and extends from the plate substantially parallel to the other bristles of the plurality of bristles, wherein the polymeric material comprises at least one of a polyurea, a polyurethane, and a polyurethane/polyurea hybrid material, and wherein the polymeric material further comprises polyether polyol.

5. The polishing brush of claim 4, wherein the polymeric material comprises a density in the range of 0.3 to 1.2 g/cm³.

6. The polishing brush of claim 5, wherein the polymeric material is characterized by pores having a mean diameter in the range of 10 microns to 3 millimeters.

7. The polishing brush of claim 4, wherein the polymeric material comprises a density in the range of 0.4 to 0.7 g/cm³.

8. A polishing brush comprising:
a plate comprising opening; and
a plurality of bristles, wherein:
each bristle of the plurality of bristles comprises a porous polymeric material; and
each bristle of the plurality of bristles comprises a constrained proximal end within the opening and an unconstrained distal end,
wherein each bristle of the plurality of bristles is secured to the plate and extends from the plate substantially parallel to the other bristles of the plurality of bristles, and wherein the polymeric material comprises at least one of an MDI (methylene diphenyl diisocyanate) and a TDI (toluene diisocyanate) type polyether polyurethane.

9. A polishing brush comprising:
a plate comprising opening; and
a plurality of bristles, wherein:
each bristle of the plurality of bristles comprises a porous polymeric material; and
each bristle of the plurality of bristles comprises a constrained proximal end within the opening and an unconstrained distal end, wherein each bristle of the plurality of bristles is secured to the plate and extends from the plate substantially parallel to the other bristles of the plurality of bristles, and wherein the polymeric material comprises one of an MDI and a TDI type polyester polyurethane.

10. A polishing brush comprising:
a plate comprising opening; and
a plurality of bristles, wherein:
  each bristle of the plurality of bristles comprises a porous polymeric material; and
  each bristle of the plurality of bristles comprises a constrained proximal end within the opening and an unconstrained distal end,
wherein each bristle of the plurality of bristles is secured to the plate and extends from the plate substantially parallel to the other bristles of the plurality of bristles, and wherein the polymeric material comprises one or more surfactants.

11. The polishing brush of claim 10, wherein at least one of the surfactants comprises a fluorosurfactant.

12. A polishing brush comprising:
a plate comprising opening; and
a plurality of bristles, wherein:
  each bristle of the plurality of bristles comprises a porous polymeric material; and
  each bristle of the plurality of bristles comprises a constrained proximal end within the opening and an unconstrained distal end,
wherein each bristle of the plurality of bristles is secured to the plate and extends from the plate substantially parallel to the other bristles of the plurality of bristles, and
wherein the polymeric material comprises microballoons.

13. A method of manufacturing bristles for use in polishing a workpiece, the method comprising the steps of:
  combining a liquid polymer material and a foaming agent or using a foaming technique to form a volume of foamed polymeric material;
  separating the volume of foamed polymeric material into a plurality of bristles; and
  attaching the plurality of bristles to a plate using one or more of threading the bristles through the plate, sewing the bristles to the plate, and using an interference fit to retain a portion of each bristle,
  wherein the foaming agent is configured to impart a density to the polymeric material in the range of 0.3 to 1.2 g/cm$^3$,
  wherein each bristle of the plurality of bristles extends from the plate substantially parallel to the other bristles of the plurality of bristles, and
  wherein the combining step further comprises adding polyether polyol in the range of 1% to 8% by weight.

14. The method of claim 13 wherein the polymeric material is characterized by pores having a mean diameter in the range of 10 microns to 1 millimeter.

15. The method of claim 13 wherein the polymeric material comprises at least one of a polyurea, a polyurethane, and a polyurethane/polyurea hybrid material.

16. A method of manufacturing bristles for use in polishing a workpiece, the method comprising the steps of:
  combining a liquid polymer material and a foaming agent or using a foaming technique to form a volume of foamed polymeric material;
  separating the volume of foamed polymeric material into a plurality of bristles;
  attaching the plurality of bristles to a plate using one or more of threading the bristles through the plate, sewing the bristles to the plate, and using an interference fit to retain a portion of each bristle; and
  attaching the polishing brush to a rotary polishing platen,
  wherein the foaming agent is configured to impart a density to the polymeric material in the range of 0.3 to 1.2 g/cm$^3$, and
  wherein each bristle of the plurality of bristles extends from the plate substantially parallel to the other bristles of the plurality of bristles.

17. A polishing brush comprising:
a base plate; and
a plurality of bristles extending from the base plate,
wherein each bristle comprises a porous polymeric material characterized by: i) pores having a mean diameter in the range of 10 microns to 3 millimeters; and ii) a density in the range of 0.3 to 1.2 g/cm$^3$, and
wherein each bristle of the plurality of bristles is secured to the plate and extends from the plate substantially parallel to the other bristles of the plurality of bristles and wherein each bristle is sewn into the plate.

* * * * *